(12) United States Patent
Wei et al.

(10) Patent No.: US 11,057,799 B2
(45) Date of Patent: Jul. 6, 2021

(54) DEVICES AND METHODS FOR SLICE-COMPLIANT HANDOVER CONTROL

(71) Applicant: Huawei Technologies Co., Ltd., Shenzhen (CN)

(72) Inventors: Qing Wei, Munich (DE); Ömer Bulakci, Munich (DE); Emmanouil Pateromichelakis, Munich (DE); Riccardo Trivisonno, Munich (DE); Chenghui Peng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/580,948

(22) Filed: Sep. 24, 2019

(65) Prior Publication Data

US 2020/0022033 A1    Jan. 16, 2020

Related U.S. Application Data

(63) Continuation of application No. PCT/EP2017/057136, filed on Mar. 24, 2017.

(51) Int. Cl.
*H04W 36/00* (2009.01)
*H04W 36/08* (2009.01)
*H04W 88/10* (2009.01)

(52) U.S. Cl.
CPC ... *H04W 36/0055* (2013.01); *H04W 36/0072* (2013.01); *H04W 36/08* (2013.01); *H04W 88/10* (2013.01)

(58) Field of Classification Search
CPC ............... H04W 36/005; H04W 36/08; H04W 36/0072; H04W 36/0077; H04W 36/0066
See application file for complete search history.

(56) References Cited

U.S. PATENT DOCUMENTS

| | | | |
|---|---|---|---|
| 2016/0353367 A1 | 12/2016 | Vrzic et al. | |
| 2017/0086118 A1 | 3/2017 | Vrzic | |
| 2018/0317148 A1* | 11/2018 | Jin | H04W 36/08 |
| 2019/0021043 A1* | 1/2019 | Youn | H04W 36/0055 |
| 2019/0158360 A1* | 5/2019 | Xu | H04W 92/20 |
| 2019/0261233 A1* | 8/2019 | Duan | H04W 36/0066 |

OTHER PUBLICATIONS

"Solution on Network Slice Instance Reselection," SA WG2 Meeting #116BIS, Sanya P.R. China, S2-165256, pp. 1-9, 3rd Generation Partnership Project, Valbonne, France (Aug. 29-Sep. 2, 2016).

(Continued)

*Primary Examiner* — Magdi Elhag
(74) *Attorney, Agent, or Firm* — Leydig, Voit & Mayer, Ltd.

(57) ABSTRACT

A network entity is configured to control a handover of a user equipment from a serving base station to a candidate target base station of a mobile communication network. The serving base station provides at least a first slice of a first slice type, and the candidate target base station provides at least a second slice of a second slice type. The user equipment is registered to the first slice of the serving base station. The network entity includes a processor configured to control, in response to a handover trigger, the handover of the user equipment on the basis of a requested slice type and the second slice type provided by the candidate target base station.

15 Claims, 7 Drawing Sheets

(56) References Cited

OTHER PUBLICATIONS

"3rd Generation Partnership Project; Technical Specification Group Services and System Aspects; Study on Architecture for Next Generation System," 3GPP TR 23.799 V2.0.0, pp. 1-523, 3rd Generation Partnership Project, Valbonne, France (Nov. 2016).
"Solution: Support of Switching of Network Slice," SA WG2 Meeting #S2-114, Sophia Antipolis, France, S2-161413, pp. 1-3, 3rd Generation Partnership Project, Valbonne, France (Apr. 11-15, 2016).
"3rd Generation Partnership Project; Technical Specification Group Services and System Aspects; System Architecture for the 5G System," 3GPP TS 23.501 V0.3.0, pp. 1-97, 3rd Generation Partnership Project, Valbonne, France (Feb. 2017).
"Update the network slicing use case in SMARTER," 3GPP TSG-SA WG1 Meeting #71, Belgrade, Serbia, S1-152395 revision of S1-152074, pp. 1-3, 3rd Generation Partnership Project, Valbonne, France (Aug. 17-21, 2015).
"3rd Generation Partnership Project; Technical Specification Group Radio Access Network; Study on New Radio Access Technology; Radio Access Architecture and Interfaces," 3GPP TR 38.801 V1.2.0, pp. 1-90, 3rd Generation Partnership Project, Valbonne, France (Feb. 2017).
"3rd Generation Partnership Project; Technical Specification Group Services and System Aspects; Policy and charging control architecture (Release 14)," 3GPP TS 23.203 V14.2.0, pp. 1-256, 3rd Generation Partnership Project, Valbonne, France (Dec. 2016).

* cited by examiner

DEVICES AND METHODS FOR SLICE-COMPLIANT HANDOVER CONTROL

CROSS-REFERENCE TO RELATED APPLICATIONS

This application is a continuation of International Application No. PCT/EP2017/057136, filed on Mar. 24, 2017, the disclosure of which is hereby incorporated by reference in its entirety.

TECHNICAL FIELD

In general, embodiments of the present invention relate to the field of mobile communications. More specifically, embodiments of the present invention relate to communication devices and methods for slice-compliant handover control in a mobile communication network.

BACKGROUND

Network slicing is introduced in the 5th Generation (5G) mobile technology to satisfy various requirements of multiple vertical industries assuming a shared network infrastructure. Network services can be customized based on the requirements of different use cases, increasing the network operation efficiency. Network slicing is an end-to-end concept according to the current definition being discussed in 3GPP TR23.501 v0.3.0, wherein the network slice is defined as follows: "The network slice is a complete logical network that comprises of a set of network functions and corresponding resources necessary to provide certain network capabilities and network characteristics. It includes both 5G Radio Access Network (RAN) and 5G Core Network (CN)".

Due to diverse deployment and dynamic situations (e.g., varying loads, resources) in the 5G Radio Access Network (RAN), some slices may be available only in parts of the mobile network. When an active user equipment (UE) moves, it may go to an area where the active session of a slice cannot be supported. In that case, the UE may need to drop the session in that slice, register to another slice, and resume the session in the new registered slice. Such procedures take a long time and may negatively affect the continuity of services provided to the UE.

In conventional 4G LTE systems, a handover decision is made at the serving base station or by the network (i.e., control plane elements of the core network thereof). The serving base station or the network makes the handover decision based on a radio measurement report from the UE (including all the visible transmission points), the UE context (e.g., mobility pattern), and the network status (e.g., load balancing). A target base station performs admission control based on the availability of resources and accepts a handover request only if sufficient resources are available at the target base station. Each base station also maintains some policies from the core network, such as a list referred to as a Close Subscribe Group (CSG), and only accepts a handover request from the UEs listed in the CSG. Since the concept of network slicing is not defined in 4G systems or in older mobile networks, there is no slice-related treatment of handover control.

In 5G systems, the way of handling a slice request is described in 3GPP TR38.801 in the following way: "The RAN and the CN are responsible to handle a service request for a slice that may or may not be available in a given area. Admission or rejection of access to a slice may depend on factors such as support for the slice, availability of resources, support of the requested service by other slices." Thus, when receiving a handover request of a certain slice, the target base station can reject the access to the slice due to the unavailability of a slice, which would result in a handover failure. As will be appreciated, the increase of the handover failure ratio introduces more signaling overhead in the mobile network and negatively affects the latency of the UE.

Thus, in light of the above there is a need for improved communication devices and methods allowing slice-compliant handover control in mobile communication networks.

SUMMARY

Embodiments of the present invention provide improved communication devices and methods allowing slice-compliant handover control in mobile communication networks.

Generally, embodiments of the present invention provide various advantages for the handover procedure of a user equipment in the context of network slices in 5G mobile networks, such as providing a very time efficient handover procedure by utilizing slice-related information in the handover control and making the handover procedure slice-compliant. Embodiments of the present invention employ two stages of handover control with slice-related treatment, namely a joint slice-aware handover decision and a slice-aware adaptation/admission control. Such a joint two stage handover control utilizes the rich local context as much as possible, such as the UE context of the active session and requested slice type, at the handover decision point as well as the capabilities and the admission policy at the target base station. Meanwhile, embodiments of the present invention allow addressing the impacts of dynamic resource variations with respect to the slice availability without related context exchange between the neighboring base stations involved in the handover. In this way, the signaling overhead can be significantly reduced.

As will be described in more detail further below, according to embodiments of the present invention the slice-aware handover decision is performed at the handover decision point, namely at the serving base station (herein also referred to as SBS), such as an evolved node B, currently serving the user equipment, or a mobility management entity located in the core network of the mobile communication network. The serving base station or the mobility management entity check the slices or slice types supported at one or more suitable candidate target base stations (herein also referred to as TBSs) and make the handover decision on the basis thereof. The handover decision can include deciding on whether to trigger the handover procedure or not, selecting the target base station and the target slice type to perform the handover.

According to embodiments of the present invention, a slice-aware adaptation and admission control can be performed at the selected target base station. The TBS can check a cross-slice management policy, availability of resources to support the requested or target slice identified in the handover request, as well as its adaptation capability and can acknowledge the handover request, if the handover request can be supported by the TBS. As will be described in more detail further below, adaptation refers to the capability of the TBS to provide a slice on the basis of an existing slice, which is able to satisfy the requirements of the requested service. As will be described in more detail further below, the admitted slice can be the requested slice, the target slice, or another slice.

According to a first aspect of the present invention, a network entity configured to control a handover of a user equipment from a serving base station to a candidate target base station of a mobile communication network is provided. The serving base station provides at least a first slice of a first slice type, and the candidate target base station provides at least a second slice of a second slice type. The user equipment is registered to the first slice of the serving base station. The network entity includes: a processor configured to control, in response to a handover trigger, the handover of the user equipment on the basis of a requested slice type (i.e. on the basis of information about the requested slice type) and the second slice type supported by the candidate target base station (i.e. on the basis of information about the second slice type provided by the candidate target base station). In an implementation form, the requested slice type can be provided along with the handover trigger, for instance, by the user equipment. In an implementation form, neighboring base stations of the mobile communication network could be configured to exchange intermittently such information, i.e. information about the slice types provided at each base station.

Thus, an improved network entity for a mobile communication network is provided allowing slice-compliant handover control in the mobile communication network.

The handover trigger can originate from the user equipment or from the mobile communication network. The network entity can be the serving base station itself or a part thereof. Alternatively, the network entity can be a mobility management network entity, for instance, a mobility management network server being implemented in a core network of the mobile communication network.

In a further exemplary implementation form of the first aspect, the processor is configured to control the handover of the user equipment on the basis of the requested slice type and the second slice type by selecting the candidate target base station as the target base station, if the requested slice type is equal to the second slice type, i.e. if the requested slice type is available at the candidate base station. In an implementation form, the requested slice type, the first slice type and/or the second slice type are defined by NSSAI (network slice selection assistance information) or S-NSSAI (single network slice selection assistance information) as defined by the specification 3GPP TR23.799.

In a further exemplary implementation form, the requested slice type is associated with a requested service grade, and the second slice type is associated with a second service grade. The processor is further configured to compare, in case the requested slice type is not equal to the second slice type, i.e. the requested slice type is not available at the candidate target base station, the requested service grade with the second service grade, and is configured to select the candidate target base station as the target basis station and to select the second slice type as the target slice type, in case the requested service grade is smaller than the second service grade, i.e. in case the services provided by the requested slice type can be provided by the second slice type. As will be appreciated, the service grade of a slice type can be a kind of quantifiable performance, quality or functional measure, such as data traffic bandwidth supported by the slice type, a QoS class, type of mobility support and the like. A service grade can be integrated as a part of a slice type identifier, such as NSSAI or S-NSSAI, or derived therefrom.

In a further exemplary implementation form of the first aspect, the processor is further configured to determine, in case the requested service grade is larger than the second service grade, i.e. in case the second service type is not capable of providing the services required by the requested slice type, whether the at least second slice of the second slice type of the candidate target base station can be adjusted to provide the services provided by the requested slice type and, if this is the case, to select the candidate target base station as the target basis station and the second slice type as the target slice type. In an implementation form, the second slice of the candidate target base station can be adjusted, for instance, on the basis of slice remapping and/or RAN adaptation techniques.

In a further exemplary implementation form of the first aspect, the serving base station provides at least a further slice of a further slice type and the processor is further configured to trigger, in case the at least second slice of the second slice type of the candidate target base station cannot be adjusted to provide the services provided by the requested slice type, the user equipment to select, i.e. to register with the further slice type provided by the serving base station.

In a further exemplary implementation form of the first aspect, the processor is further configured to determine, in case the requested service grade is larger than the second service grade, i.e. in case the second service type is not capable of providing the services required by the requested slice type, whether the at least first slice of the first slice type of the serving base station can be adjusted to provide the services provided by the requested slice type and, if this is the case, do nothing (i.e., do not trigger the handover procedure) or trigger UE slice reselection (e.g., by drop the associated PDU sessions). As in the case of the slice adjustment by the target base station the slice adjustment of the serving base station can be performed, for instance, on the basis of slice remapping and/or RAN adaptation techniques.

In a further exemplary implementation form of the first aspect, the network entity further comprises a communication interface configured to send a handover request including the requested slice type to the selected target base station.

In a further exemplary implementation form of the first aspect, the processor is further configured to include a target slice identifier in the handover request to be forwarded to the selected target base station by the communication interface, where the target slice identifier is configured to identify a target slice type selected by the processor of the serving base station. In an implementation form, the target slice identifier can be part of NSSAI (network slice selection assistance information) or S-NSSAI (single network slice selection assistance information).

According to a second aspect of the present invention, a corresponding method is provided for controlling a handover of a user equipment from a serving base station to a candidate target base station of a mobile communication network. The serving base station provides at least a first slice of a first slice type, and the candidate target base station provides at least a second slice of a second slice type. The user equipment is registered to the first slice of the serving base station. The method includes the step of: controlling, in response to a handover trigger, the handover of the user equipment on the basis of a requested slice type (i.e. information about the requested slice type) and the second slice type provided by the candidate target base station (i.e. information about the second slice type provided by the candidate target base station).

The method according to the second aspect of the present invention can be performed by the network entity according to the first aspect of the present invention. Further features of the method according to the second aspect of the present invention result directly from the functionality of the network entity according to the first aspect of the present invention and its different implementation forms.

According to a third aspect of the present invention, a target base station is provided that is configured to perform a handover of a user equipment from a serving base station to the target base station of a mobile communication network The serving base station provides at least a first slice of a first slice type, and the target base station provides at least a second slice of a second slice type. The user equipment is originally, i.e. prior to the handover registered to the first slice of the serving base station. The target base station includes a communication interface configured to receive a handover request from the serving base station or a mobility management network entity of the mobile communication network for performing the handover from the serving base station to the target base station. The handover request includes a requested slice type. The target base station further comprises a processor configured to process the handover request on the basis of the requested slice type (i.e. information about the requested slice type) and the second slice type (i.e. information about the second slice type supported by the target base station).

In a further exemplary implementation form of the third aspect, the processor is further configured to process the handover request on the basis of the requested slice type (i.e. information about the requested slice type), the second slice type (i.e. information about the second slice type supported by the target base station) and a cross slice management policy defined for the user equipment.

In a further exemplary implementation form of the third aspect, the handover request further includes a target slice identifier for identifying a target slice type, and the processer of the target base station is configured to select an allocated slice type on the basis of the requested slice type, the target slice type, and the second slice type.

In a further exemplary implementation form of the third aspect, the communication interface is configured to positively acknowledge the handover request to the serving base station or the mobility management network entity by means of a handover acknowledgement message, in case the requested slice type is equal to the second slice type, i.e. in case the requested slice type is available at the candidate target base station.

In a further exemplary implementation form of the third aspect, the communication interface is configured to include the allocated slice type in the handover acknowledgement message. The allocated slice type could be the requested slice type, the target slice type, or a different slice type provided by the target base station.

In a further exemplary implementation form of the third aspect, the processor is configured to process the handover request on the basis of the requested slice type and the second slice type by adjusting the second slice of the second slice type to provide the services provided by the requested slice type.

According to a fourth aspect of the present invention, a corresponding method of performing a handover of a user equipment from a serving base station to a target base station of a mobile communication network is provided. The serving base station provides at least a first slice of a first slice type and the target base station provides at least a second slice of a second slice type. The user equipment is originally, i.e. prior to the handover, registered to the first slice of the serving base station. The method includes the steps of: receiving a handover request from the serving base station or a mobility management network entity of the mobile communication network for performing the handover from the serving base station to the target base station, where the handover request includes a requested slice type; and processing the handover request on the basis of the requested slice type (i.e. information about the requested slice type) and the second slice type (i.e. information about the second slice type).

According to a fifth aspect of the present invention, a computer program is provided that includes program code for performing the method according to the fourth aspect when executed on a computer.

Embodiments of the present invention can be implemented in hardware and/or software.

BRIEF DESCRIPTION OF THE DRAWINGS

Embodiments of the present invention will be described with respect to the following figures, wherein.

In the various figures, identical reference signs will be used for identical or at least functionally equivalent features.

DETAILED DESCRIPTION OF THE EMBODIMENTS

In the following description, reference is made to the accompanying drawings, which form part of the disclosure, and in which are shown, by way of illustration, aspects in which embodiments of the present invention may be implemented. It is understood that other aspects may be utilized and structural or logical changes may be made without departing from the scope of the present invention. The following detailed description, therefore, is not to be taken in a limiting sense, as the scope of the present invention is defined by the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

Figure 1:
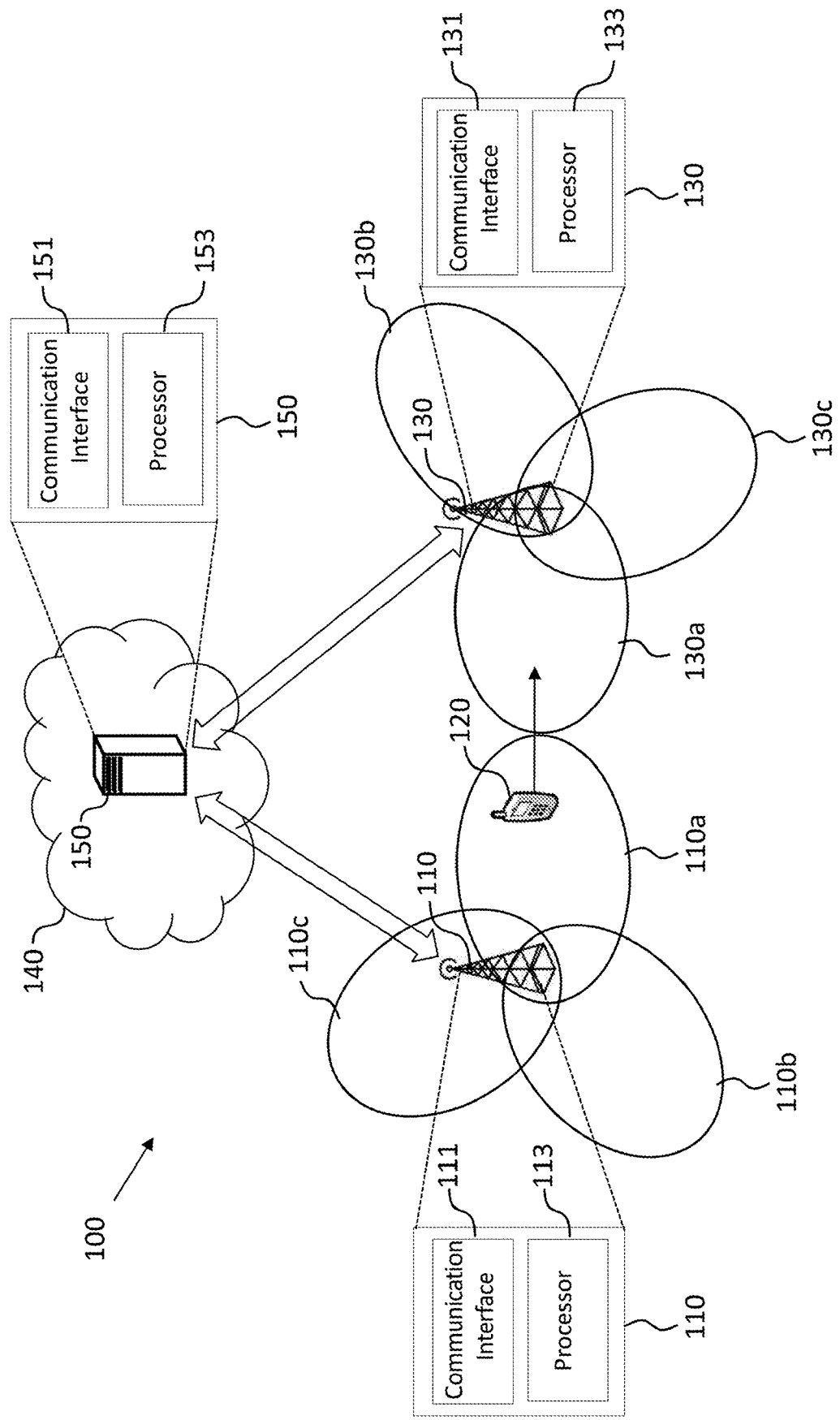
FIG. 1 shows a schematic diagram illustrating a mobile communication network including a serving base station, a user equipment, a target base station and a mobility management network entity according to an exemplary embodiment.

FIG. 1 shows a schematic diagram illustrating a mobile or cellular communication network 100 including a serving base station 110, a user equipment 120, a target base station 130, and a mobility management network entity 150 according to an exemplary embodiment, which can be located in a core network of the mobile communication network 100. For the sake of clarity, only one candidate target base station 130 is shown in the exemplary scenario of FIG. 1. As will be appreciated, however, the mobile communication network 100 can include a plurality of candidate target base stations, such as the candidate target base station 130, out of which the serving base station 110 or the mobility management network entity 150 can select a selected target base station 130 in the context of the slice-compliant handover control described in the following.

Both the serving base station 110 and the mobility management network entity 150 constitute a network entity, which is configured to control a handover of the user equipment 120 from the serving base station 110 to the (candidate) target base station 130. Thus, in the following the expression "network entity 110, 150" will be used to mean either the serving base station 110 or the mobility management network entity 150.

As already mentioned, the network entity 110, 150 is configured to control a handover of the user equipment 120 from the serving base station 110 to the (candidate) target base station 130 of the mobile communication network 100, where the serving base station 110 provides at least a first slice 110a-c of a first slice type (in the exemplary scenario shown in FIG. 1 the serving base station 110 provides three slices 110a-c, which can have the same or different slice types) and the candidate target base station 130 provides at least a second slice 130a-c of a second slice type (in the exemplary scenario shown in FIG. 1 the target base station 130 provides three slices 130a-c, which can have the same or different slice types). Originally, the user equipment 120 is registered to the first slice 110a-c of the serving base station 110. A network slice is defined, for instance, in the specification 3GPP TR23.501 as a complete logical network that comprises of a set of network functions and corresponding resources needed to provide certain network capabilities and network characteristics.

As can be taken from FIG. 1, the network entity 110, 150 includes a processor 113, 153 configured to control, in response to a handover trigger, the handover of the user equipment 120 on the basis of a requested slice type, i.e. information about the requested slice type, such as an identifier for identifying the requested slice type, and the second slice type supported by the candidate target base station 130, i.e. information about the second slice type provided by the candidate target base station 130, such as an identifier for identifying the second slice type provided by the candidate target base station. As will be appreciated, according to embodiments of the present invention, the requested slice type and the second slice type can be the same, i.e. equal. The handover could be triggered, for instance, by the user equipment 120 itself or could be a handover triggered by the network 100. In embodiment, the requested slice type can be provided along with the handover trigger, for instance, by the user equipment 120.

The target base station 130 includes a communication interface 131 configured to receive a handover request from the serving base station 110 or the mobility management network entity 150 of the mobile communication network 100 for performing the handover from the serving base station 110 to the target base station 130, where the handover request comprises the requested slice type; and a processor 133 configured to process the handover request on the basis of the requested slice type, i.e. information about the requested slice type, such as an identifier for identifying the requested slice type, and the second slice type, i.e. information about the second slice type provided by the target base station 130, such as an identifier for identifying the second slice type provided by the target base station 130.

Further exemplary embodiments of the network entity, i.e. the serving base station 110, mobility management network entity 150, and the target base station 130 will be described in the following.

According to embodiments of the present invention, there are three main criteria to evaluate whether a requested slice type can be supported at the target base station 130: The first criterion is the type of slice, which is declared available at the target base station 130. The second criterion relates to service grade of the requested slice type. A slice type with a higher grade can support the services of a slice type with a lower grade, e.g., a slice type with higher bandwidth, lower latency Key Performance Indicator (KPI) has higher service grade. Such service grade can be either a relative number agreed between neighboring base stations or standardized number associated to each slice type. One similar case is the 3GPP Quality of Service (QoS) framework, where each QoS class is mapped to certain QoS characteristics like priority, packet delay budget, packet error loss, etc. The QoS class with lower packet delay budget and/or lower packet error loss can be considered as a class with higher service grade. Since additional features of a network slice like bandwidth, functionality, etc., are not covered by the current QoS policies, it is advantageous to introduce a service grade in addition to the existing QoS parameters during a handover request. The third criterion is Radio Access Network (RAN) adaptation capability at both serving 110 and target 130 base stations managing whether a requested slice can be supported temporarily by RAN adaptation, e.g., extending the coverage of the serving base station 110 to reach the target base station 130 where the requested slice type is supported. There are multiple ways to obtain the adaptation capability of the potential target base station 130. In an implementation form, neighboring base stations of the mobile communication network could be configured to intermittently exchange such information, i.e. information about the adaption capability at each base station Other possibilities could be by returning information about an allocated, i.e. admitted slice type in a handover request acknowledgement message or by negotiation between the serving 110 and target 130 base stations.

Figure 2:
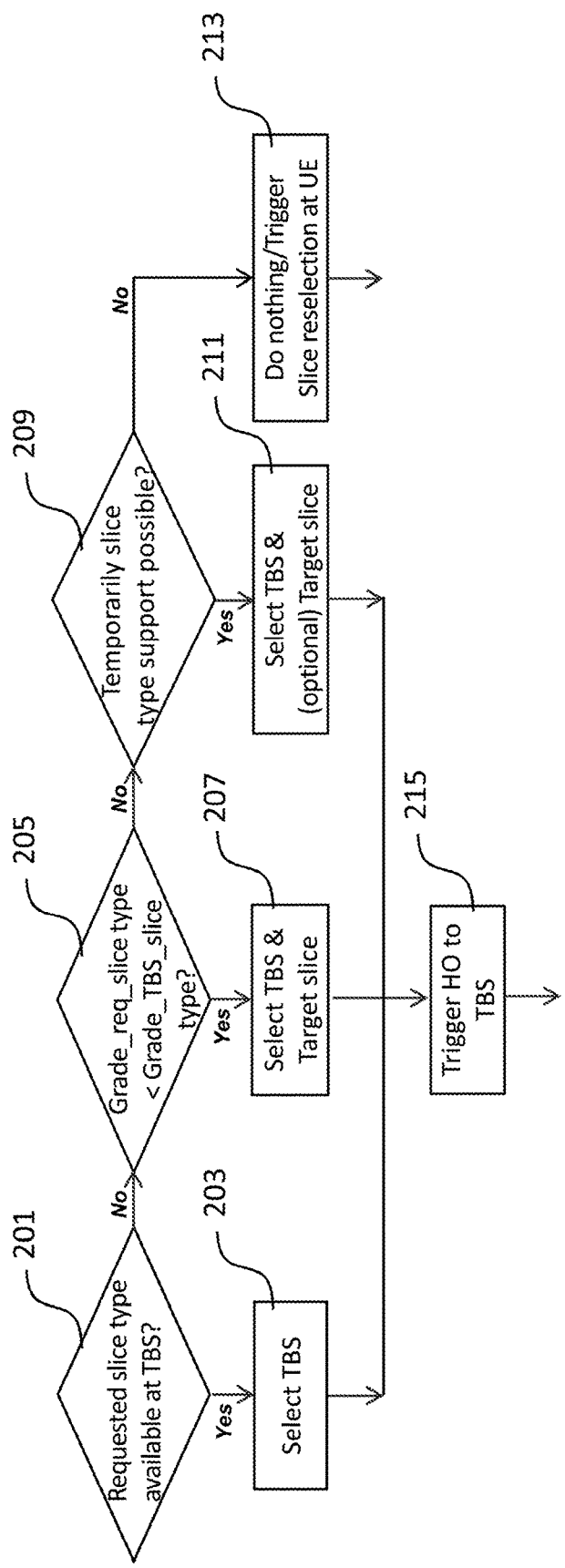
FIG. 2 shows a schematic diagram illustrating processing steps of a slice-compliant handover control according to an exemplary embodiment.

FIG. 2 shows a schematic diagram illustrating an exemplary procedure of slice-aware handover decision as implemented in embodiments of the present invention. The procedure includes the following steps:

The network entity 110, 150, i.e. the serving base station 110 or the mobility management network entity 150, can check first whether a requested slice is supported by one of the candidate target base stations 130 (step 201).

If yes, the network entity 110,150 selects a target base station 130 (step 203).

If no, the network entity 110, 150 further checks whether the requested slice type can be supported by an available slice type with higher service grade at the candidate target base stations 130 (step 205).

If yes, the network entity 110, 150 selects the corresponding target base station 130 and a target slice type (step 207).

If no, the network entity 110, 150 checks whether the requested slice type can be supported by the candidate target base stations 130 temporarily, for instance, using a RAN adaptation technique (step 209).

If yes, the network entity 110, 150 selects the corresponding target base station 130 and optionally can select an allocated slice type based on whether it is necessary to change to another slice type available at the selected target base station 130 (step 211).

If no, the network entity 110, 150 does not trigger the handover to the target base station 130 (step 213). Additionally or alternatively, a slice reselection can be trigged at the user equipment 120, e.g., by dropping the current active session of the UE 120 for that slice.

Admission control performed by the target base station 130 according to embodiments of the present invention can be based on the resource availability for the requested/target slice (e.g., in case of isolated resource for different slices) and/or cross-slice management policies (e.g., in case of shared resource for different slices). Examples of cross-slice management policy could be: first, the same slice service request indicated by the target slice type can have a lower priority of admission than the one indicated by the requested slice type; secondly, the slice service request indicated by the requested slice type should not use any reserved resources for that slice type.

The adaptation of a slice to perform admission is based on an actual resource situation and/or adaptation capability at the target base station 130 according to embodiments of the present invention. The key points here are: the target base station 130 can choose to perform the admission control based on the requested slice type or the target slice type; the target base station 130 can choose a slice other than the requested slice type or the target slice type, namely the admitted (or allocated) slice type to perform the admission control (i.e. to allow the handover); the admitted (or allocated) slice type can be indicated to the serving base station 110 and/or the mobility management network entity 150 in the handover request acknowledgement message.

Figure 3:
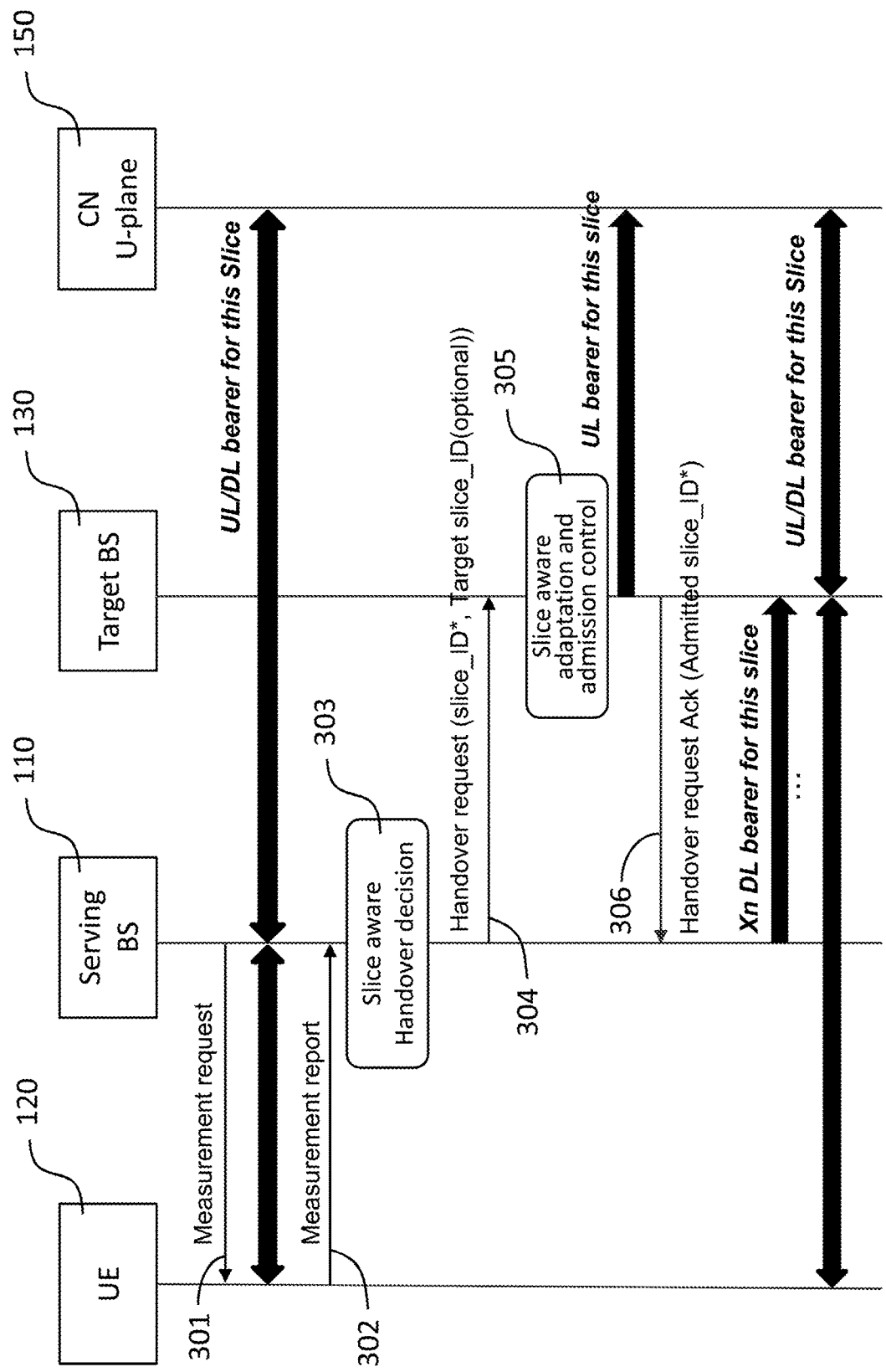
FIG. 3 shows a schematic diagram illustrating processing steps of a UE-triggered slice-compliant handover according to an exemplary embodiment.

FIG. 3 shows a diagram illustrating a procedure for exchanging messages during a UE-triggered Xn based handover according to an exemplary embodiment, where messages are exchanged between the serving 110 and target 130 base stations during the handover control. Similar procedures can be derived for a N2 based handover, where messages are exchanged between the target base stations 130 and the mobility management network entity 150 during the handover control. The target slice type is the slice type to be handed over to the target base station 130; the admitted slice type is the final slice type accepted by the target base station 130, which, as described above, can be based on the actual resource situation, adaptation capability at the target base station 130 and the like. The procedure shown in FIG. 3 comprises the following steps.

The serving base station 110 sends a request message to the UE 120 for measurement. (step 301).

The UE 120 sends a report of measurement to the serving base station 110 (step 302).

This triggers the serving base station 110 to perform a slice-aware handover decision according to an exemplary embodiment of the present invention (step 303).

If a handover is needed, the serving base station 110 sends a handover request to the target base station 130, wherein the handover request includes the requested slice type that the UE 120 is requesting (indicated by slice_ID) and also a target slice identifier for identifying the target slice type selected by the serving base station 110 (indicated by Target slice_ID). The slice_ID here is a general term that indicates the type of the slice, e.g., S-NSSAI specified in 3GPP TR 23.799 including a network Slice/Service Type (SST) and a Slice Differentiator (SD), and also the service level indication of the slice, e.g., service grade (step 304).

The target base station 130 performs slice-aware adaptation and admission control (step 305) according to an exemplary embodiment of the present invention.

If the handover request is accepted, the target base station 130 sends a handover request acknowledgement message comprising an admitted slice type (indicated by the admitted slice_ID) to the serving base station 110, wherein the admitted slice type in the handover request acknowledgement message can be either the requested slice type requested by the UE 120, the target slice type selected by the network entity 110, 150 or another slice type (step 306).

In some cases, the mobility management network entity 150 may trigger a handover of the UE 120 for network management/optimization purpose, e.g., load balancing. In such a case, the mobility management network entity 150 as part of the core plane of the core network 140 of the mobile communication network 100 instead of the serving base station 110 can make the handover decision, as shown in FIG. 4.

Figure 4:
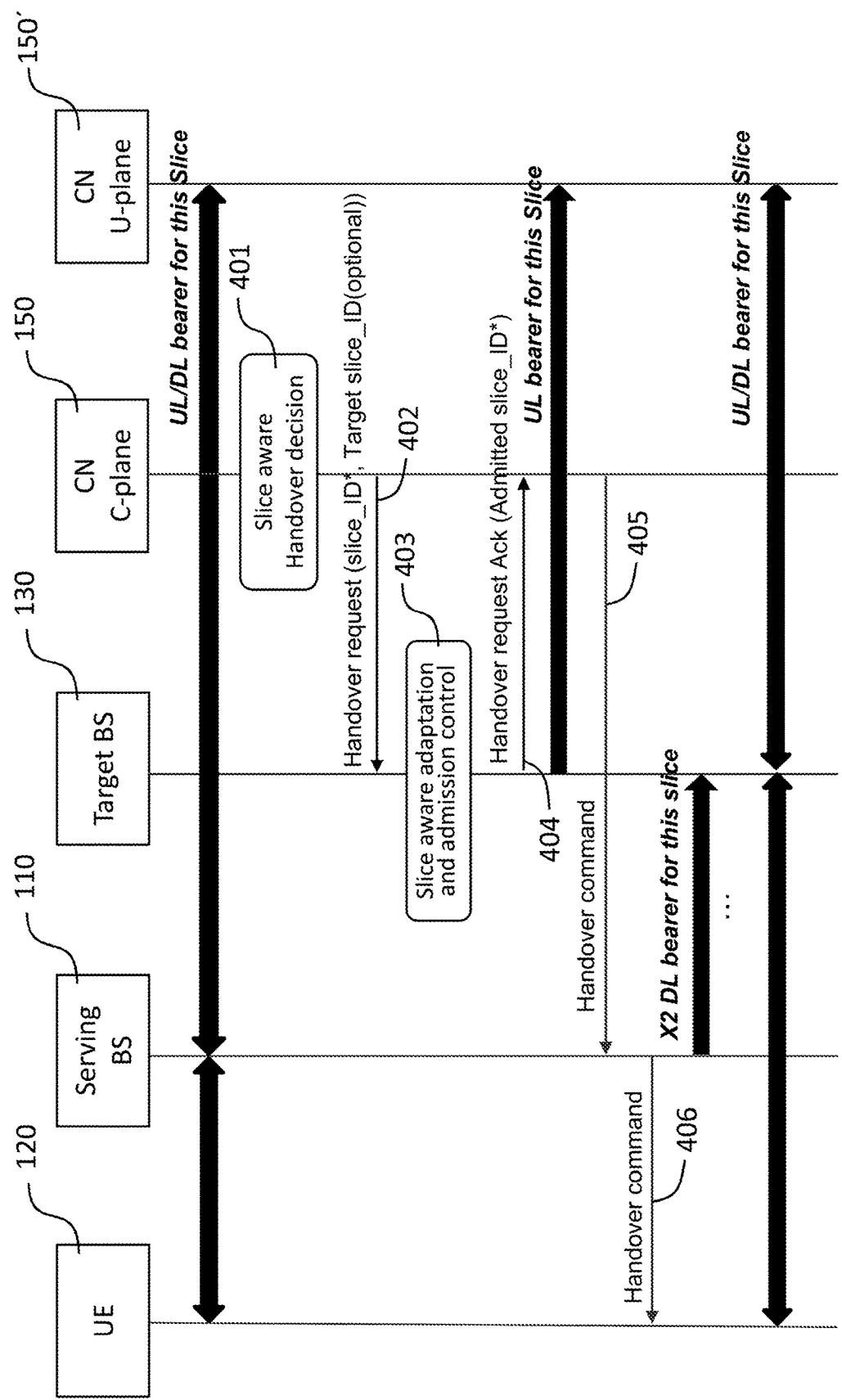
FIG. 4 shows a schematic diagram illustrating processing steps of a network-triggered slice-compliant handover according to an exemplary embodiment.

FIG. 4 shows a diagram illustrating a procedure for exchanging messages during a network-triggered Xn based handover according to an exemplary embodiment. For the sake of clarity, the steps for the triggering of the handover procedure (e.g. the handover required message from the RAN to the CN) have been omitted in FIG. 4. The procedure shown in FIG. 4 comprises the following steps.

The mobility management network entity 150 performs slice-aware handover decision (step 401) according to an exemplary embodiment of the present invention.

If a handover is needed, the mobility management network entity 150 sends a handover request to the target base station 130 including the requested slice type (slice_ID) and also the target slice identifier for identifying the target slice type (target slice_ID; step 402).

The target base station 130 performs slice-aware adaptation and admission control (step 403) according to an exemplary embodiment of the present invention.

If the handover request is accepted, the target base station 130 sends a handover request acknowledgement message comprising the admitted (or allocated) slice type (admitted slice_ID) to the mobility management network entity 150 (step 404).

The mobility management network entity 150 sends a handover command to the serving base station 110 (step 405).

The serving base station 110 sends a handover command to the user equipment 120 (step 406).

Figure 5:
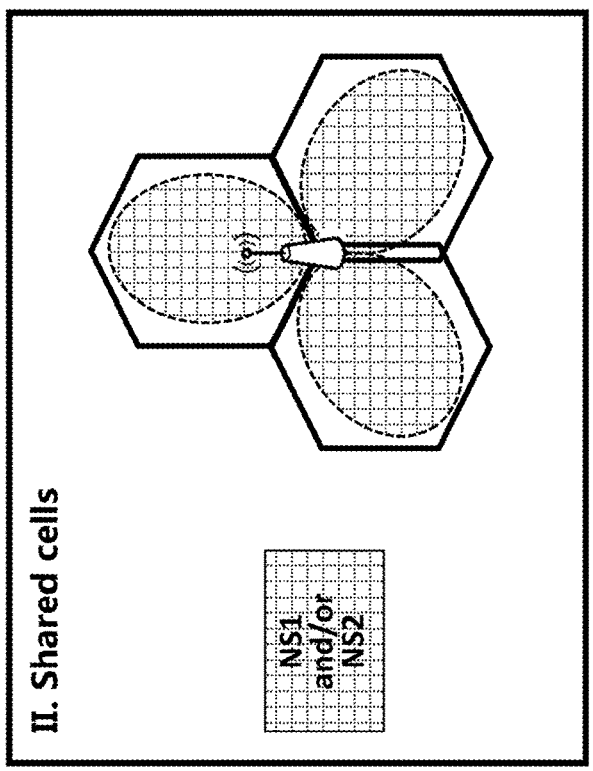
FIG. 5 shows a schematic diagram of different RAN deployment modes for network slicing implemented in a serving base station and/or a target base station according to an exemplary embodiment.
Figure 5:
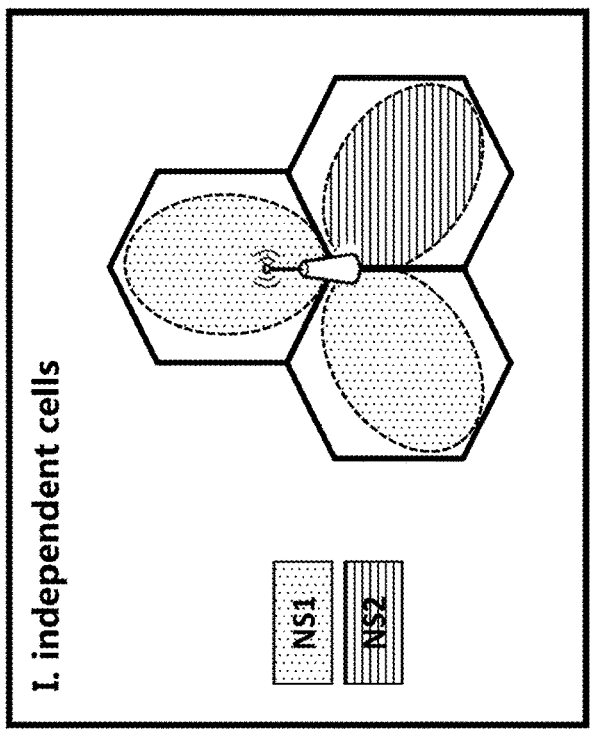

According to the actual deployment of network slices at the Radio Access Network (RAN), a cell can either support fixed slice types—deployment mode I for independent cells, or support different slice types—deployment mode II for shared cells, as shown in FIG. 5.

FIGS. 5A and 5B show a schematic diagram of different RAN deployment modes of network slicing for independent cells and shared cells, respectively, which can be used by the serving base station 110 and/or the target base station 130 according to exemplary embodiments of the present invention. In the case of slice deployment mode I, embodiments of the present invention allow to switch to the RAN configuration for a different slice type (i.e., target slice type or admitted slice type).

In both deployment modes, embodiments of the present invention can utilize the breathing/adaptation capability of the RAN to temporarily accommodate the required slice type. Here the breathing/adaptation capability comprises temporarily changing the transmission range for a slice at the serving and/or target base stations 110, 130, adjusting the resource allocation between different slices, and the like.

Figure 6:
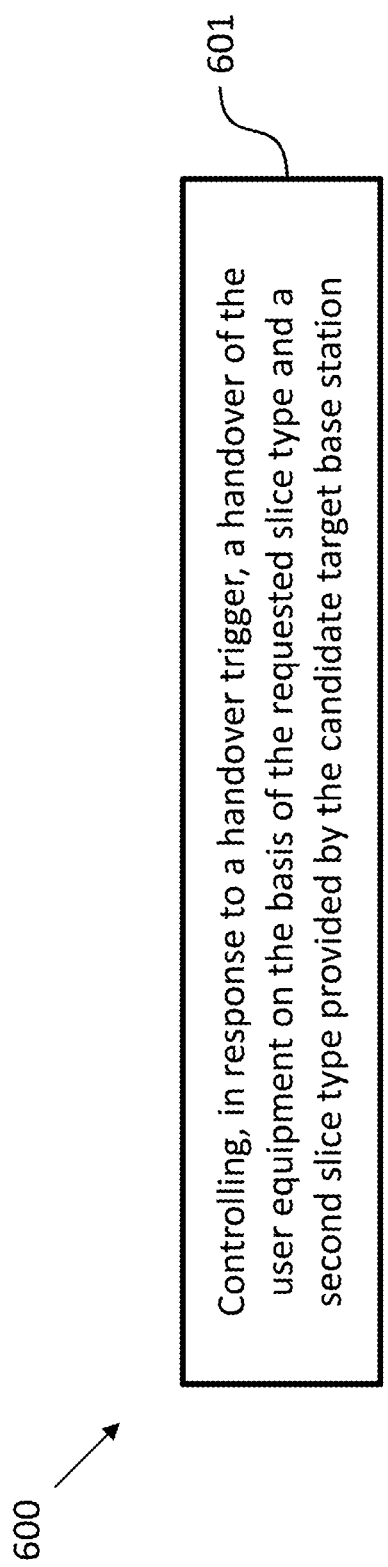
FIG. 6 shows a schematic diagram illustrating a method for controlling a slice-compliant handover according to an exemplary embodiment.

FIG. 6 shows a schematic diagram illustrating an exemplary method 600 for controlling a handover of the user equipment 120 from the serving base station 110 to the candidate target base station 130 of the mobile communication network 100. As already described above, the serving base station 110 provides at least a first slice 110a-c of a first slice type and the candidate target base station 130 provides at least a second slice 130a-c of a second slice type, where the user equipment 120 is originally registered to the first slice 110a-c of the serving base station 110.

The method 600 includes the step 601 of controlling, in response to a handover trigger, the handover of the user equipment 120 on the basis of the requested slice type, i.e. on the basis of information about the requested slice type, and the second slice type provided by the candidate target base station, i.e. information about the second slice type provided by the candidate target base station. In an embodiment, the requested slice type can be provided along with the handover trigger, for instance, by the user equipment 120.

Figure 7:
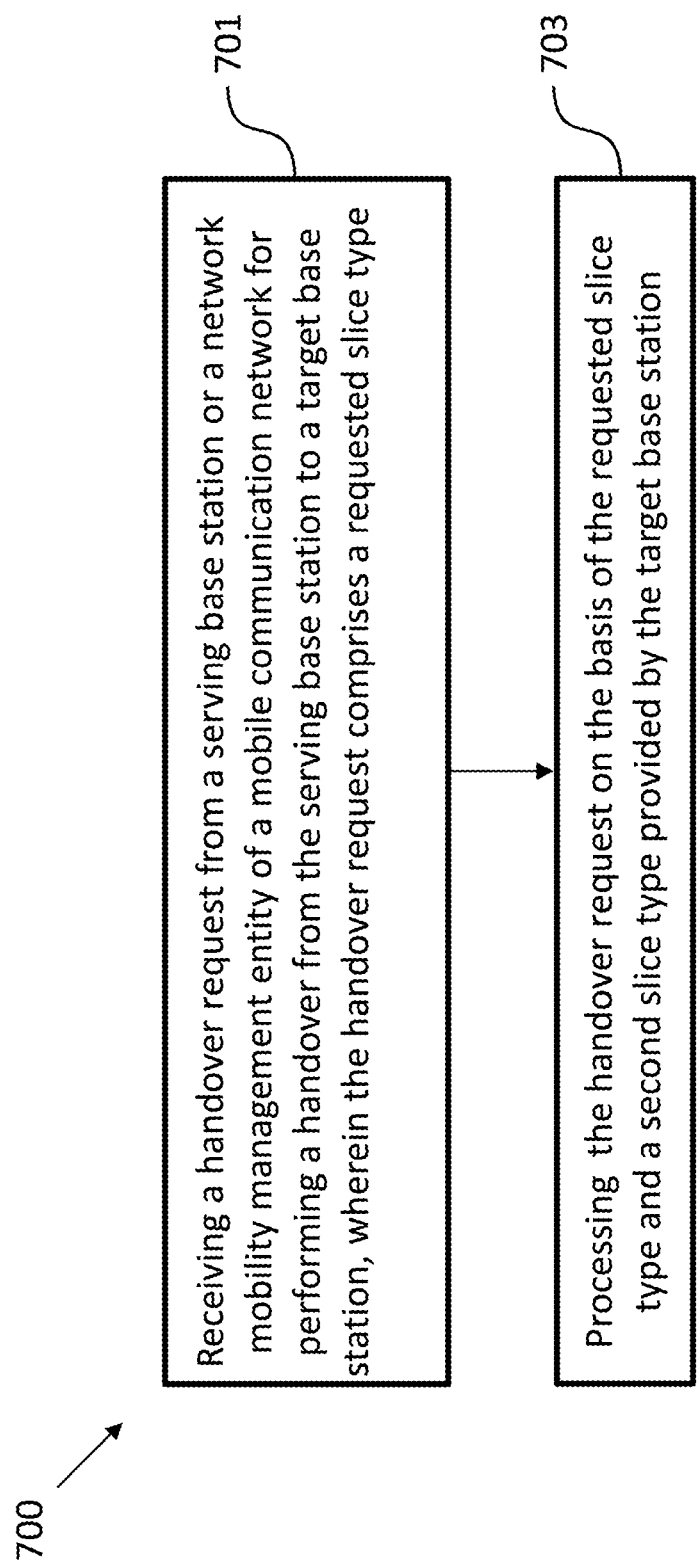
FIG. 7 shows a schematic diagram illustrating a method of performing a slice-compliant handover according to an exemplary embodiment.

FIG. 7 shows a schematic diagram illustrating an exemplary method 700 of performing the handover of the user equipment 120 from the serving base station 110 to the target base station 130 of the mobile communication network 100. The method 700 includes the steps of: receiving 701 a handover request from the serving base station 110 or the network mobility management network entity 150 of the mobile communication network 100 for performing the handover from the serving base station 110 to the target base station 130, where the handover request comprises a requested slice type; and processing 703 the handover request on the basis of the requested slice type, i.e. information about the requested slice type, and the second slice type, i.e. information about the second slice type.

While a particular feature or aspect of the disclosure may have been disclosed with respect to only one of several implementations or embodiments, such a feature or aspect may be combined with one or more further features or aspects of the other implementations or embodiments as may be desired or advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives thereof may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the present invention beyond those described herein. While the present invention has been described with reference to one or more particular embodiments, those skilled in the art recognize that many changes may be made thereto without departing from the scope of the present invention. It is therefore to be understood that within the scope of the appended claims and their equivalents, the present invention may be practiced otherwise than as specifically described herein.

What is claimed is:

1. A network entity configured to control a handover of a user equipment from a serving base station to a candidate target base station of a mobile communication network, the serving base station configured to provide at least a first slice of a first slice type, and the candidate target base station configured to provide at least a second slice of a second slice type, the user equipment being registered to the first slice of the serving base station, the network entity comprising:
a processor configured to control, in response to a handover trigger, the handover of the user equipment on the basis of a requested slice type and the second slice type provided by the candidate target base station,
wherein the requested slice type is associated with a requested service grade,
wherein the second slice type is associated with a second service grade, and
wherein the processor is further configured to:
compare, in a case where the requested slice type is not equal to the second slice type, the requested service grade with the second service grade, and
select the candidate target base station as a target base station and the second slice type as the target slice type, in a case where the requested service grade is smaller than the second service grade.

2. The network entity of claim 1, wherein the processor is configured to control the handover of the user equipment by selecting the candidate target base station as the target base station, in a case where the requested slice type is equal to the second slice type.

3. The network entity of claim 1, wherein the processor is further configured to determine, in the case where the requested service grade is larger than the second service grade, whether the at least second slice of the second slice type of the candidate target base station is adjustable to provide the services provided by the requested slice type and, if this is the case, to select the candidate target base station as the target base station and to select the second slice type as the target slice type.

4. The network entity of claim 1, wherein the processor is further configured to determine, in the case the requested service grade is larger than the second service grade, whether the at least the first slice of the first slice type of the serving base station is adjustable to provide the services provided by the requested slice type, and, if this is the case, to not trigger the handover or drop the related traffic flow.

5. The network entity of claim 1, wherein the network entity further comprises a communication interface configured to send a handover request comprising the requested slice type to the selected target base station.

6. The network entity of claim 5,
wherein the processor is further configured to include a target slice identifier in the handover request for forwarding to the selected target base station by the communication interface, and
wherein the target slice identifier is configured to identify the target slice type selected by the processor.

7. A method for controlling a handover of a user equipment from a serving base station to a candidate target base station of a mobile communication network, the serving base station providing at least a first slice of a first slice type and the candidate target base station providing at least a second slice of a second slice type, the user equipment being registered to the first slice of the serving base station, the method comprising:
controlling, in response to a handover trigger, the handover of the user equipment on the basis of a requested slice type and the second slice type provided by the candidate target base station,
wherein the requested slice type is associated with a requested service grade,
wherein the second slice type is associated with a second service grade, and
wherein the method further comprises:
comparing, in a case where the requested slice type is not equal to the second slice type, the requested service grade with the second service grade, and
selecting the candidate target base station as a target base station and the second slice type as the target slice type, in a case where the requested service grade is smaller than the second service grade.

8. A target base station configured to perform a handover of a user equipment from a serving base station to the target base station of a mobile communication network, the serving base station providing at least a first slice of a first slice type and the target base station providing at least a second slice of a second slice type, the user equipment being originally registered to the first slice of the serving base station, the target base station comprising:
a communication interface configured to receive a handover request from the serving base station or a mobility management network entity of the mobile communication network for performing the handover from the serving base station to the target base station, wherein the handover request comprises a requested slice type; and
a processor configured to process the handover request on the basis of the requested slice type and the second slice type,
wherein the requested slice type is associated with a requested service grade,
wherein the second slice type is associated with a second service grade, and
wherein the processor is further configured to:
compare, in a case where the requested slice type is not equal to the second slice type, the requested service grade with the second service grade, and
adjust the target base station to provide the services provided by the requested slice type, in a case where the requested service grade is smaller than the second service grade.

9. The target base station of claim 8, wherein the processor is further configured to process the handover request on the basis of the requested slice type, the second slice type, and a cross slice management policy defined for the user equipment.

10. The target base station of claim 9,
wherein the handover request further comprises a target slice identifier for identifying the target slice type, and
wherein the processor is configured to select an allocated slice type on the basis of the requested slice type, the target slice type, and the second slice type.

11. The target base station of claim 8, wherein the communication interface is configured to acknowledge the handover request to the serving base station or the mobility management network entity by a handover acknowledgement message, in a case where the requested slice type is equal to the second slice type.

12. The target base station of claim 11, wherein the communication interface is configured to include the allocated slice type in the handover acknowledgement message.

13. A method of performing a handover of a user equipment from a serving base station to a target base station of a mobile communication network, the serving base station supporting at least a first slice of a first slice type and the target base station supporting at least a second slice of a second slice type, the user equipment being originally registered to the first slice of the serving base station, the method comprising:
receiving a handover request from the serving base station or a mobility management network entity of the mobile communication network for performing the handover from the serving base station to the target base station, wherein the handover request comprises a requested slice type; and
processing the handover request on the basis of the requested slice type and the second slice type,
wherein the requested slice type is associated with a requested service grade,
wherein the second slice type is associated with a second service grade, and
wherein the method further comprises:
comparing, in a case where the requested slice type is not equal to the second slice type, the requested service grade with the second service grade, and
adjusting the target base station to provide the services provided by the requested slice type, in a case where the requested service grade is smaller than the second service grade.

14. A non-transitory computer readable medium comprising computer program comprising program code for performing the method of claim 8, when executed on a computer or a processor.

15. A non-transitory computer readable medium comprising computer program comprising program code for performing the method of claim 13, when executed on a computer or a processor.

* * * * *